United States Patent [19]
Lederer et al.

[11] Patent Number: 5,225,997
[45] Date of Patent: Jul. 6, 1993

[54] AUTOMATIC MONITORING AND REMOTE REPORTING DEVICE

[75] Inventors: Gabor Lederer, Leonia; Donald Wilcox, Paramus; John W. Lang, Closter, all of N.J.

[73] Assignee: Sygnus Controls Inc., Paterson, N.J.

[21] Appl. No.: 533,362

[22] Filed: Jun. 5, 1990

[51] Int. Cl.$^5$ .................... G08B 27/00; G08B 1/08
[52] U.S. Cl. .................... 364/550; 340/506; 358/427; 379/106
[58] Field of Search .................... 364/550, 551.01, 200, 364/900; 358/402, 427, 400, 434, 470; 379/106, 100; 340/506, 522

[56] References Cited

U.S. PATENT DOCUMENTS

| | | | |
|---|---|---|---|
| 3,824,334 | 7/1974 | Jacobson et al. | 379/104 |
| 4,396,906 | 8/1983 | Weaver | 358/427 |
| 4,531,189 | 7/1985 | Mosier et al. | 364/550 |
| 4,652,933 | 3/1987 | Koshiishi | 364/518 |
| 4,847,894 | 7/1989 | Chanvin et al. | 379/104 |
| 4,964,065 | 10/1990 | Hicks et al. | 364/550 |
| 4,996,703 | 2/1991 | Gray | 379/106 |
| 5,061,916 | 10/1991 | French | 340/522 |

FOREIGN PATENT DOCUMENTS 0093252 4/1989 Japan .................... 379/106

OTHER PUBLICATIONS

Syngus Controls, Inc.; Data Acquisition Monitoring and Reporting System; Jan. 1990.

*Primary Examiner*—Parshotam S. Lall
*Assistant Examiner*—Michael Zanelli
*Attorney, Agent, or Firm*—Israel Nissenbaum

[57] ABSTRACT

A device for direct monitoring of a system with pre-scheduled, request or alarm reports being generated and sent to remote locations via facsimile transmission, with the reports being pre-formatted, as desired, such as in tabular or graphical form. The device interfaces with sensors which continuously directly monitor analog data such as temperature, pH, pressure values, or digital data such as limit switches, etc. of an operating system. Multiple process variable input channels or interfaces permit monitoring of different parameters. Each parameter can be reported in different page format. A conversion element within the device converts analog data from the operating system to digital form for immediate analysis and/or storage and later retrieval and/or analysis of operating conditions and parameters. Upon a predetermined condition, a report condition is sensed and stored data is retrieved, by the device, into suitable combination with a pre-programmed page format such as tabular or graphical form. The data, integrated with appropriate page format, is then converted by the device to facsimile machine readable form. The device is directly connected with a telephone line for transmission, with proper handshaking controlled by the device, via direct telephone transmission to one or more remote facsimile devices which print out reports in original readily readable, not optically scanned, form.

24 Claims, 10 Drawing Sheets

FIG. 3a

DAMAR SYSTEM REPORT                                    FRI JAN 26 90   14:38

=========================START OF REPORT 06:00 09-30-89=========CHANNEL 02=========

DELIVER TO: JOHN SMITH, ENGINEERING, ROOM 442

TITLE: EFFLUENT FLOW, PRIMARY EFFLUENT, TREATMENT PLANT B

```
REPORT PERIOD: 1 MONTH           READING UNITS:    U.S. GALLONS
DATA INTERVAL: 24 HOURS          A ALARM SETTING:  004000         FUNCTION: HIGH
INPUT ZERO:    000.0             B ALARM SETTING:  004500         FUNCTION: HIGH
INPUT SPAN:    015.0             C ALARM SETTING:  005000         FUNCTION: HIGH
```

| TIME/DATE       | TOTAL | ACCUMUL      | TIME/DATE | TOTAL | ACCUMUL | TIME/DATE |
|-----------------|-------|--------------|-----------|-------|---------|-----------|
| 06:00  10-01-89 | 2375  | 2375         |           |       |         |           |
| 06:00  10-02-89 | 3788  | 6163         |           |       |         |           |
| 06:00  10-03-89 | 1999  | 8162         |           |       |         |           |
| 06:00  10-04-89 | 3879  | 12041        |           |       |         |           |
| 06:00  10-05-89 | 3551  | 15592        |           |       |         |           |
| 22:34  10-05-89 | 4000  | *A ALARM*    |           |       |         |           |
| 04:44  10-06-89 | 4500  | *B ALARM*    |           |       |         |           |
| 06:00  10-06-89 | 4722  | 20314        |           |       |         |           |
| 06:00  10-07-89 | 3588  | 23902        |           |       |         |           |
| 06:00  10-08-89 | 0     | 23902        |           |       |         |           |
| 06:00  10-09-89 | 0     | 23902        |           |       |         |           |
| 06:00  10-10-89 | 0     | 23902        |           |       |         |           |
| 06:00  10-11-89 | 2222  | 29712        |           |       |         |           |
| 06:00  10-12-89 | 1988  | 31700        |           |       |         |           |
| 06:00  10-13-89 | 3455  | 35155        |           |       |         |           |

(SAMPLE REPORT)

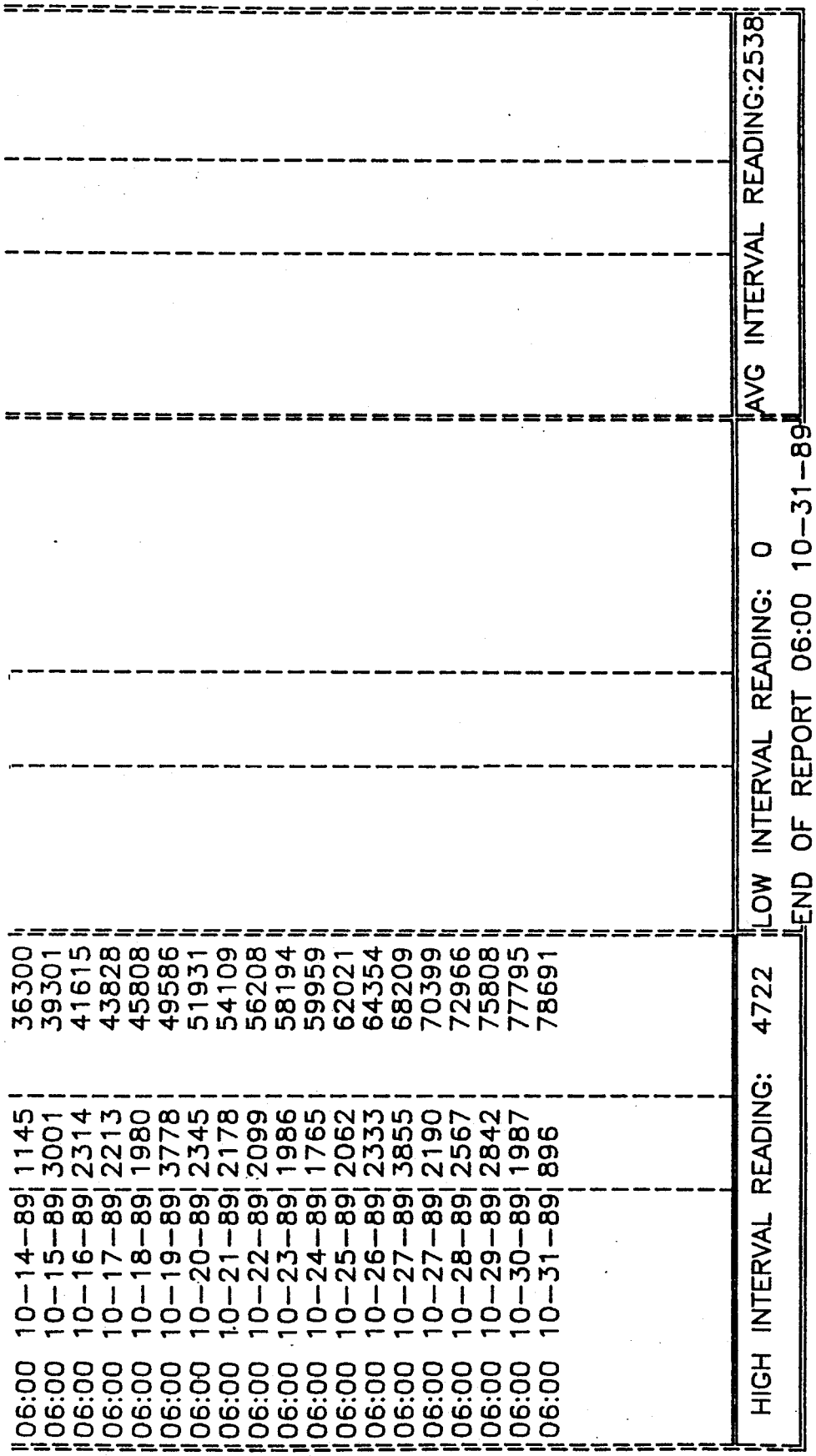

| TIME/DATE | INSTANT | AVERAGE |
|---|---|---|
| 13:51 03/20/90 | 27.09 | 27.11 |
| 13:53 03/20/90 | 27.14 | 27.11 |
| 13:55 03/20/90 | 27.09 | 27.11 |
| 13:57 03/20/90 | 27.09 | 27.11 |
| 13:59 03/20/90 | 27.14 | 27.11 |
| 14:01 03/20/90 | 27.11 | 27.11 |
| 14:03 03/20/90 | 27.09 | 27.11 |
| 14:05 03/20/90 | 27.09 | 27.11 |
| 14:07 03/20/90 | 27.09 | 27.10 |
| 14:09 03/20/90 | 27.09 | 27.10 |
| 14:11 03/20/90 | 27.12 | 27.10 |
| 14:13 03/20/90 | 27.09 | 27.10 |
| 14:15 03/20/90 | 27.09 | 27.11 |
| 14:17 03/20/90 | 27.14 | 27.11 |
| 14:19 03/20/90 | 27.09 | 27.11 |
| 14:21 03/20/90 | 27.14 | 27.11 |
| 14:23 03/20/90 | 27.09 | 27.11 |
| 14:25 03/20/90 | 79.29 | *HIGH* |
| 14:25 03/20/90 | 82.99 | *HIGH* |

DELIVER TO: CYGNUS INC.
TITLE: TEMPERATURE MONITORING, PRIMARY EFFLUENT, TREATMENT PLANT B

REPORT PERIOD: 2 HOURS
DATA INTERVAL: 2 MINUTES
INPUT ZERO: −10:00
INPUT SPAN: 90:00

READING UNITS: DEG F
A ALARM SETTING: 0.00  FUNCTION: LOW
B ALARM SETTING: 80.00  FUNCTION: HIGH
C ALARM SETTING: 70.00  FUNCTION: HIGH

| TIME/DATE | INSTANT | AVERAGE |
|---|---|---|
| 14:45 03/20/90 | −2.41 | −2.42 |
| 14:45 03/20/90 | −2.46 | *MIN* |
| 14:47 03/20/90 | −2.41 | −2.42 |
| 14:47 03/20/90 | −2.46 | *MIN* |
| 14:49 03/20/90 | 14.12 | 1.76 |

START OF REPORT 13:49 03/20/90 — CHANNEL: 1

| Time | Date | Reading | Marker |
|---|---|---|---|
| 14:25 | 03/20/90 | 83.08 | *MAX* |
| 14:25 | 03/20/90 | 45.05 | 37.55 |
| 14:27 | 03/20/90 | 45.05 | 45.07 |
| 14:29 | 03/20/90 | 2.43 | 26.87 |
| 14:30 | 03/20/90 | −3.59 | *LOW* |
| 14:30 | 03/20/90 | −6.65 | *MIN* |
| 14:31 | 03/20/90 | −6.60 | −5.30 |
| 14:32 | 03/20/90 | −6.65 | *MIN* |
| 14:33 | 03/20/90 | 75.13 | *HIGH* |
| 14:33 | 03/20/90 | 80.13 | *HIGH* |
| 14:33 | 03/20/90 | 80.17 | *MAX* |
| 14:33 | 03/20/90 | 80.07 | 34.31 |
| 14:34 | 03/20/90 | 80.17 | *MAX* |
| 14:35 | 03/20/90 | 80.13 | 80.11 |
| 14:35 | 03/20/90 | 80.17 | *MAX* |
| 14:37 | 03/20/90 | 80.17 | 80.12 |
| 14:38 | 03/20/90 | 80.18 | *MAX* |
| 14:39 | 03/20/90 | 80.08 | 80.13 |
| 14:39 | 03/20/90 | 80.18 | *MAX* |
| 14:41 | 03/20/90 | −0.14 | *LOW* |
| 14:41 | 03/20/90 | −2.46 | *MIN* |
| 14:41 | 03/20/90 | −2.41 | 45.54 |
| 14:41 | 03/20/90 | −2.46 | *MIN* |
| 14:43 | 03/20/90 | −2.45 | −2.42 |
| 14:43 | 03/20/90 | −2.46 | *MIN* |

REPORT HIGH READING: 83.08
REPORT LOW READING: −6.65 03/20/90
END OF REPORT: 14:49 03/20/90
REPORT AVER. READING: 29.32

```
================================16:52 05/04/949================================
DELIVER TO:
SUBJECT:

*****POWER LINE FAILURE*****
```

FIG. 3f

AUTOMATIC MONITORING AND REMOTE REPORTING DEVICE

This invention relates to operating system monitoring and report transmission devices and particularly to devices for remote report transmissions.

Operating systems, are subject to various anomalies and malfunctions. It is accordingly important to constantly or at least periodically, at set time intervals, monitor the operation of the systems. Usually this is done by direct monitoring by an operator. This is however wasteful of resources, cannot always be effected, and can be subject to inattentiveness and error. Remote monitoring of an operating system has been effected in systems such as machine tool operations. The machine tools are computer controlled and have ready means for monitoring their functions on a continuous basis, via the computer which controls the tool. Thus, in U.S. Pat. No. 4,109,309, a monitoring system for computer controlled machine tools is described wherein the controlling computer stores digitized analog signals which are transmitted from a local modem to a modem at a remote location. The transmission is reconverted to the analog form for display on an oscilloscope for diagnostics.

Such remote monitoring however requires both a computer controlled device and a dedicated monitoring computer, with on-site and remote modems and computers. In addition, if a permanent record is desired, additional printers are required to be hooked to the recipient computer.

U.S. Pat. No. 4,652,933 describes the linkage between a facsimile machine and a computer for image information processing. However, only a scanned image is transmitted from various facsimile machines with a computer operating as a transmission link in the chain for "cut and paste" type of operations by the computer. No system is monitored or evaluated for operative functions.

It is an object of the present invention to provide a system monitoring device which simplifies remote monitoring.

It is a further object of the present invention to provide a device which is directly linked to system sensors for direct monitoring of system functions and parameters.

It is a still further object of the present invention to provide a device which directly converts sensed and stored data into a formatted form for direct transmission to one or more remote facsimile machines.

These and other objects, features and advantages of the present invention will become more apparent from the following discussion and drawings in which:

FIGS. 3a-f are examples of output reports generated by the device of the present invention.

Figure 1:
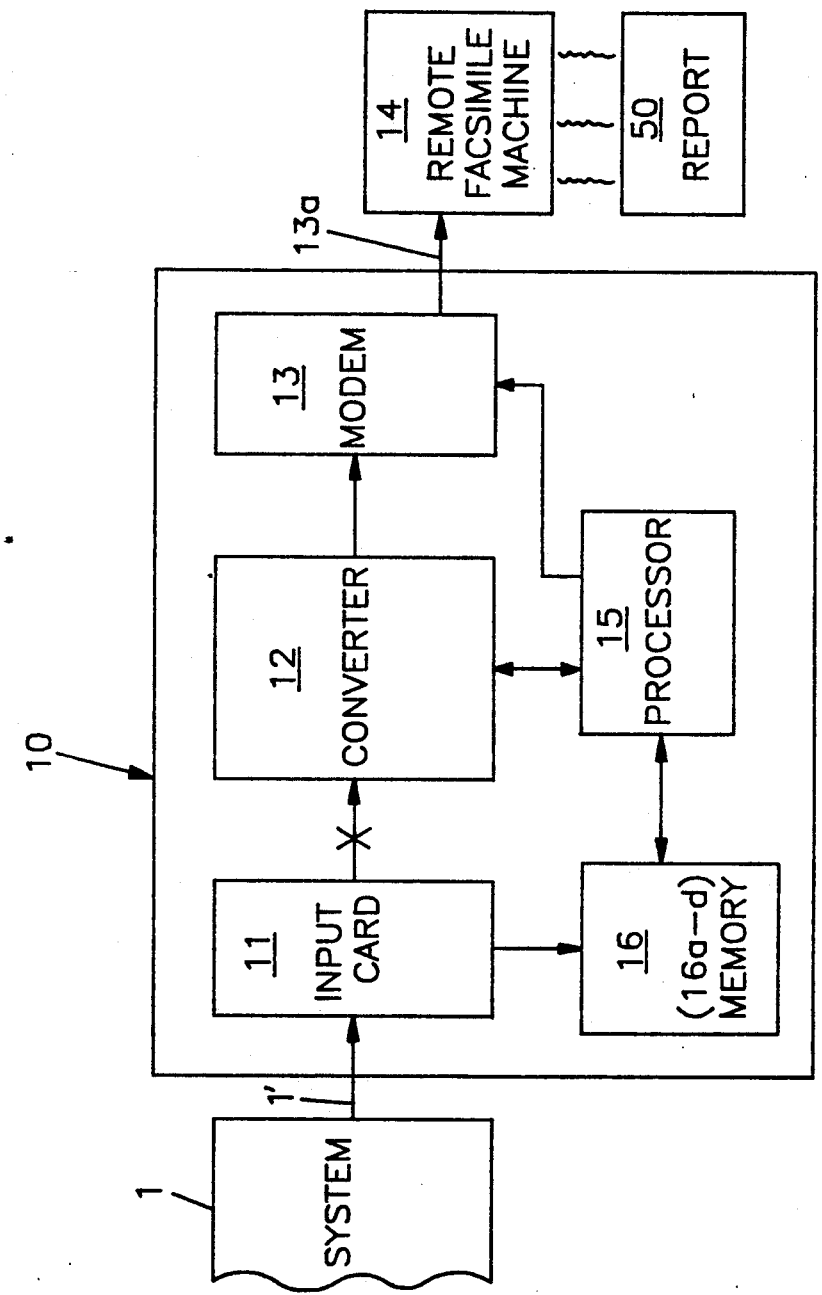
FIG. 1 is a block diagram illustrating the operation of the device of the present invention.

Generally the present invention comprises a device for direct monitoring of a system by sensing means or sensors, which collect data regarding system conditions and convert it to electrical impulses or signals. Collected data from the sensors is transmitted to one or more input channels or cards, within the device, which provide an interface means between the operating system sensors and the device. Thereafter, the signals are conditioned such as by conversion means which, if the data is in analog form, converts it to digital form for analysis by data processing means in accordance with preset alarm parameters contained within parameter tables in memory storage means. If an alarm condition is not met, the data is stored within the memory storage means until an alarm condition is met or a report generation is required. The device further comprises report initiating means activated by any or all of a pre-determined time interval, a pre-determined alarm condition, or a request condition. Under any or all of the aforesaid conditions, relevant stored data is appropriately combined with pre-formatted pages such as in tabular or graphical form. Each of the types of data collected by different sensors is capable of being generated in its own report or in combination with others with appropriate formatted pages. The device comprises means for converting the pages, with system data, from digital available stored form into a form which is understood by a facsimile machine at a remote location. The conversion is commonly called a "Huffman" encoding, with the information to be coded being first transformed to a "bit-mapped" image. Thereafter, the sequences of the high and low pixel streams of this image are transformed line by line to a compressed format, according to a pre-determined algorithm (usually stored in a look-up table) called the Huffman encoding. The device further comprises a telephone output connector for access to telephone lines for direct transmission to one or more remote facsimile machines (the pre-assigned telephone numbers of the facsimile machines being programmed into memory). The device provides proper handshaking protocol with the facsimile machine and the system data, in pre-formatted page form, is transmitted in recognizable code to the remote facsimile machine (currently, typically a G-3 type) wherein it is printed. Since there is no optical scanning of a printed document, as is the usual case with communication between facsimile machines, there is no degradation of image quality. Instead, the data is fed directly into the remote facsimile machine in its purest digitally generated form rather than converted from optical images. Preferably the system is continuously monitored particularly if system failure or preset alarm conditions cause reports to be generated.

The device further comprises means for setting the appropriate parameter tables necessary for the monitoring of various system functions and reporting under specified conditions. The basic parameters relate to (a) what to do with input data, e.g. input, store, sample rate, scale, units, etc.; (b) when to send reports, e.g. reporting period, alarm conditions; (c) where to send the reports, i.e. remote facsimile machine numbers; and (d) how (what format) the report is to be sent, e.g. tabular, graphics, etc. The setting means are for example data input elements such as an RS-232 connection for external instruction from a host or handheld programmer; a floppy disk with instructional material; a key pad with a small verification display; logic inputs such as pushbuttons or switches; or a pre-programmed cartridge or data carrier.

Physically, the device of the present invention comprises a housing, for the electronic components, which include a microprocessor, a real time clock, circuitry for input channels and memory storage chips. The housing is openable and may contain therein peripheral devices such as a small key pad and/or a floppy drive. The housing further contains an external connection to sensors via wires or cables and either a telephone jack or an extending cable for connection to a telephone jack for communication with a remote facsimile machine.

The sensors which are interfaced with the device are hooked up to the operating system which the device is monitoring, with the device being pre-programmed to accept appropriate system parameter signals, generally in the form of electric current fluctuations. These signals provide analog data such as of temperature, pH, pressure values, or digital data such as limit switches. The data signals are fed into input channels adapted for monitoring parameters and/or devices. The analog signals (as current fluctuations or as converted to voltages) are converted to digital form for further processing and/or storage within memory chips and recovery when a reporting time parameter is met, a report is requested, or an alarm condition occurs. Typical alarm conditions include excessively high or low temperatures and pH, pressures, etc., or system conditions such as power failures and the like. For such latter condition, the device is provided with its own backup power supply such as a battery pack. A bus connects the data memory storage to a controlling microprocessor.

The microprocessor, with associated memory storage chips, provide the programs and operation of the device. Programs are stored within the associated memory chips which provide instructions for device operation. Also stored are parameter tables and pre-formatted pages. The parameter tables include the alarm conditions which signal an output of stored data into the pre-formatted pages. The parameter tables further contain system failure outputs such as indications of overall power failure. The microprocessor analyzes incoming data against the parameter tables until an output or report condition is reached. The microprocessor is then programmed to convert the stored data into pre-formatted form recognized by a facsimile machine. Output is made via a high speed modem in the facsimile format through existing telephone lines to pre-assigned telephone numbers of receiving remote facsimile machines, as contained in memory storage. If desired, the device of the present invention will automatically re-transmit at periodic intervals until a satisfactory report transmission is acknowledged. Alternatively, the device may contain one microprocessor for receipt and analysis of incoming data until a report condition is reached. A second microprocessor, linked to the first one, preferably in a bi-directional mode, provides the requisite form conversion as well as the facsimile readable conversion and transmission.

With specific reference to the drawings, FIG. 1 depicts an operating system 1 with monitored data thereof in the form of an electrical signal 1′, keyed to operating system functions. The electrical signal 1′ is an input signal for monitoring device 10 via input card 11 which measures the signal, provides process storage for the signal and performs an analog to digital conversion if the signal is in analog form. Monitoring device processor 15, acting upon pre-programmed instructions from memory 16, when a reporting condition is encountered, e.g. a reporting period, an alarm condition or a report request; cumulates monitored data according to preset requirements. The processor combines such data into a preset reporting format, and transmits it to a converter 12 which converts the combined data and reporting format to the facsimile recognizable form for subsequent transmission by high speed modem 13 through phone line 13a to a remote facsimile machine 14 which prints out the report 50 in original, not optically scanned form.

Figure 1A:
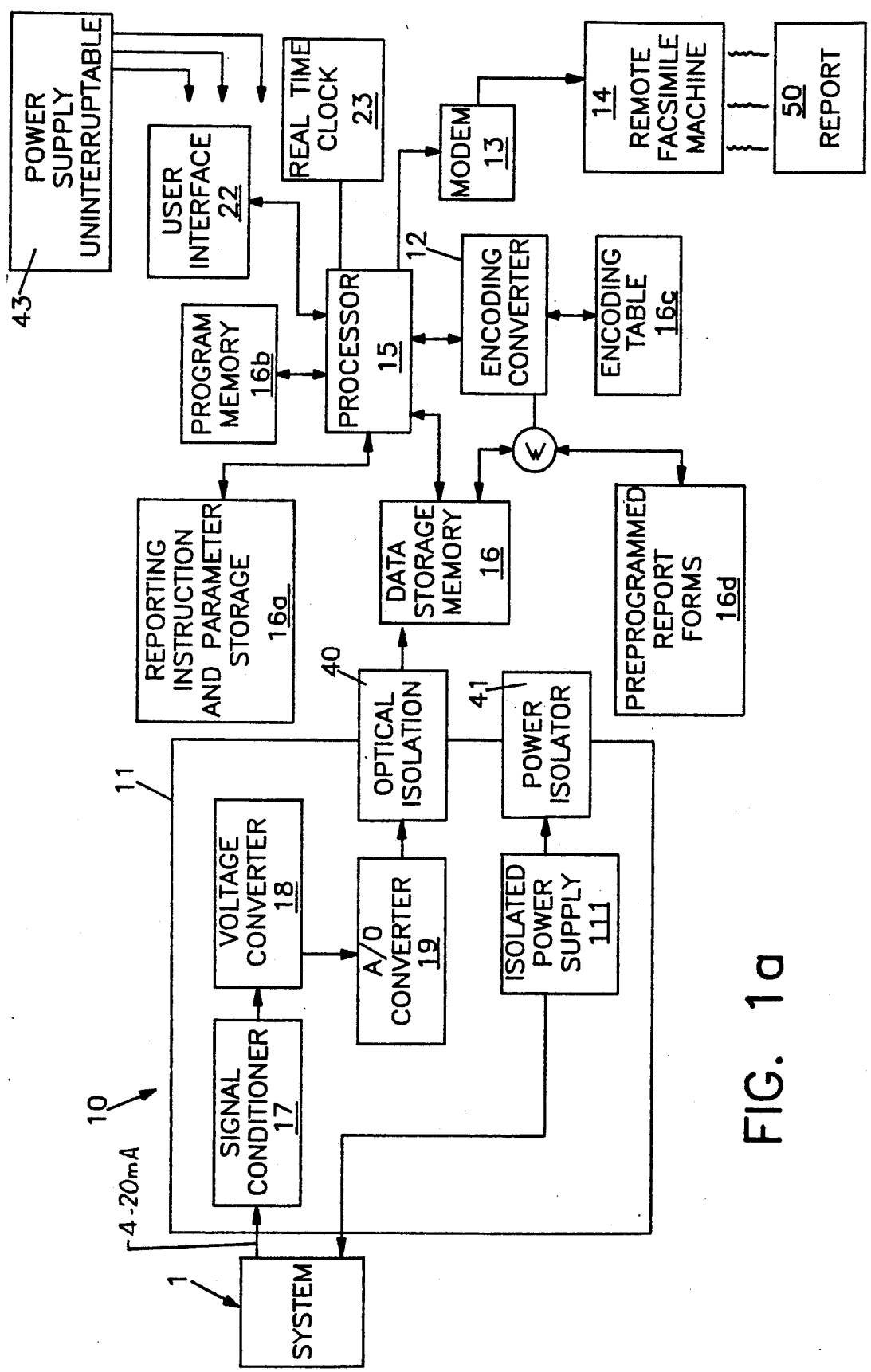
FIG. 1a is a detailed block diagram of an embodiment of the present invention with a single microprocessor.
Figure 1B:
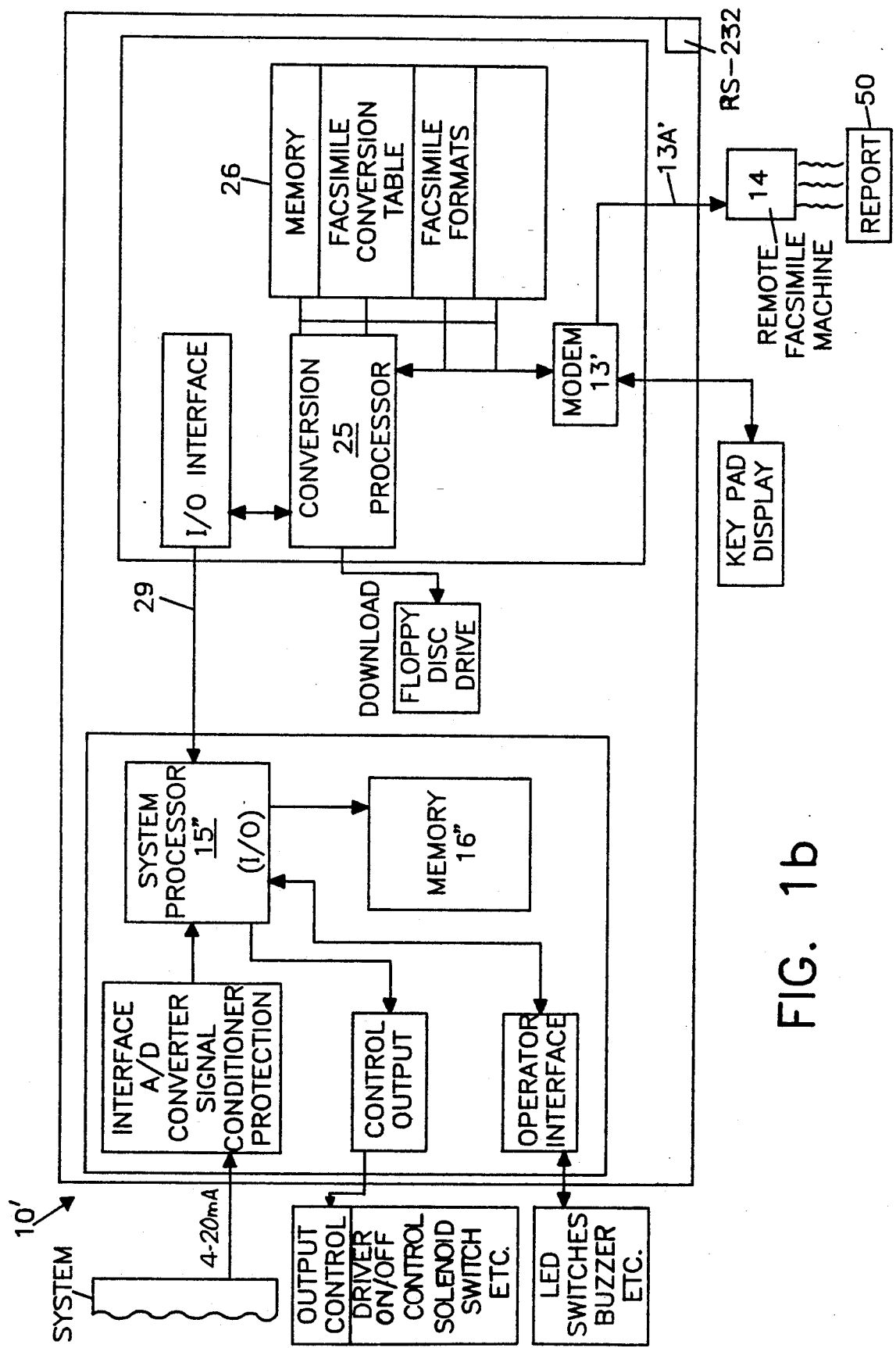
FIG. 1b is a detailed block diagram of a second embodiment of the present invention with an input processing microprocessor linked to a facsimile processor.

In FIG. 1a, system processor 15 provides the function of conditioning input data as well as converting it to proper formatted form for output and transmission to a remote facsimile machine. In FIG. 1b the system processor 15″ is bi-directionally linked to a facsimile processor 25 by either a serial or parallel connection with appropriate handshaking. In such latter embodiment the facsimile processor interfaces with operative memory 26 having facsimile conversion tables and pre-programmed facsimile formats, for conversion of the data to facsimile readable form and transmission.

In both embodiments, a 4–20 mA current loop input process variable, indicating the preset parameters of limit switch positions, pH, pressure temperature etc., enters the monitoring device 10 or 10′ via an input card 11 or 11′ respectively. FIGS. 1, 1a, and 1b indicate processing of a single input signal. However, multiple inputs of various parameters may be simultaneously monitored by a single processor. In FIG. 1a the input signal is acted on by components of the input card 11, by a signal conditioner 17 for protection, then on to voltage converter 18 and analog to digital (A/D) converter 19 which comprise the components of the input card. Each input card contains its own isolated, by power isolator 41 power supply 111. The entire device is powered by uninterruptable power supply 43. The A/D converter is optically isolated, by optical isolator 40, from data storage memory 16 to which the conditioned and converted data is thereafter routed. During operation, the data storage memory 16 periodically receives data from the system being monitored. The processor 15, with instructions contained in program memory 16b continuously examines the data with instructions from pre-programmed storage and parameters in memory 16a to determine if an alarm condition has been met (e.g. excessive temperatures, pressures and the like). An optional user interface 22 permits such instructions to be changed as desired. Such interface may be a keyboard for direct entry of commands, a floppy disk drive, cartridge with pre-loaded program, etc. A real time clock 23 provides the processor 15 with the requisite timed intervals for specific time reporting of system conditions.

When the processor 15 detects a pre-programmed time for reporting, an alarm condition, or a report request; data stored in memory, of system condition over a period of time (including an instantaneous condition report), is combined with pre-programmed report forms in memory 16d either in tabular or graphic form. The report is then facsimile encoded, by converter 12, by the processor 15 with instructions from encoding tables contained in memory 16c. Thereafter the facsimile encoded report is sent over an external telephone line to a remote facsimile machine 14 by a high speed modem 13 contained in the device.

In FIG. 1b a slightly modified device 10′ is depicted in which two microprocessors 15″ and 25 act in parallel. One microprocessor 15″ is an input/output processor which monitors system 1a conditions for the report triggering conditions. The second processor 25 is linked to the first processor by a bi-directional serial or parallel connection 29 with appropriate handshaking. The second processor 25 provides the functions of placing the collected data into pre-programmed format, converting it to facsimile readable form by proper encoding, and transmitting the formatted report to the high speed modem 13' for subsequent transmission along standard telephone lines 13a' to a remote facsimile machine 14.

Figure 2:
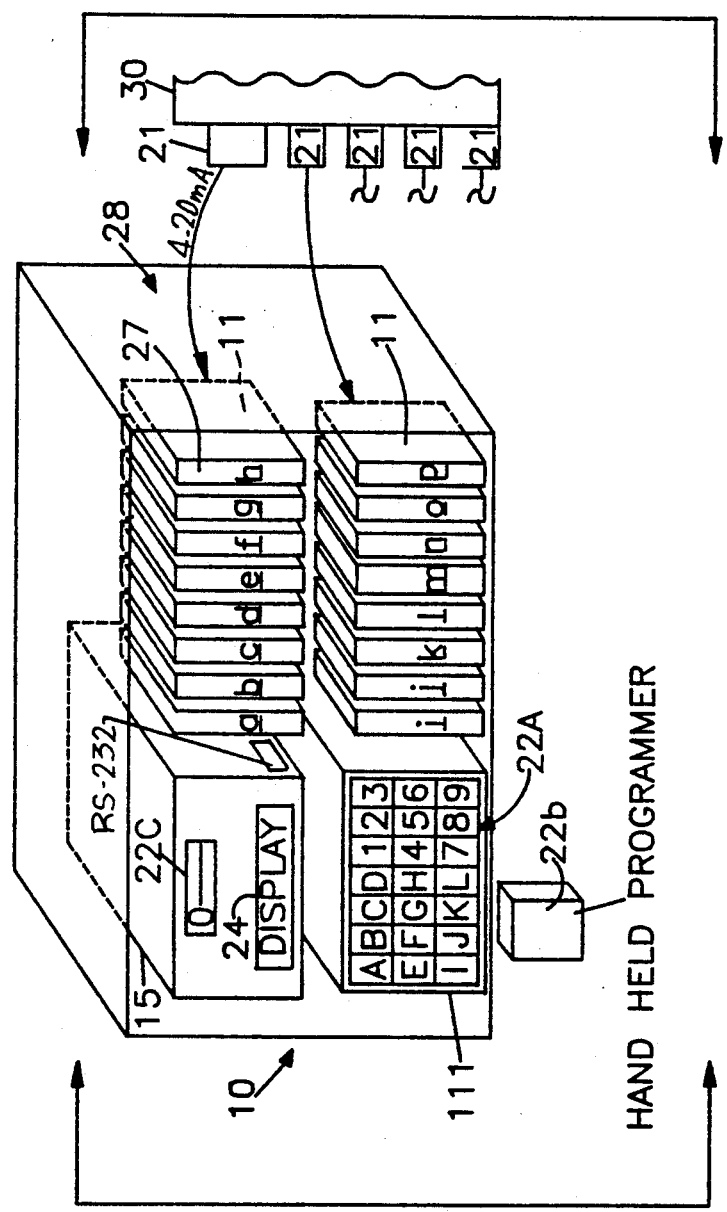
FIG. 2 is a representative schematic elevation view of the interior of the device of the present invention.

FIG. 2 depicts the system monitor and reporting device 10 and its component structure. The monitor and reporting device consists of a single 19" (48 cm) electronic chassis 28, containing a main processor 15 and individual signal input cards 11a–p. The main processor 15 includes a two line, 40 character dot matrix display 24 which scans the individual inputs and displays the process values. At the site of the operating system 30, data input is monitored by sensors 21. Sixteen plug-in input cards 11a–p are shown with each accepting a 4–20 mA signal from the sensors 21, with the inputs being completely optically isolated from each other. A 24 VDC, 30 mA power supply 111 is provided on each input channel input, to power a 2 wire current loop where needed. Each input card includes an on-line/disable switch 27 allowing for selective deactivation of the input channel. A small membrane keypad 22a is contained within chassis 28 for entering simple parameter changes. Alternatively, particularly for major formatting changes, a hand held programmer 22b is utilized. Since upon each generated report, data is purged from the system, floppy disk drive 22c is optionally utilized for storage or archival purposes.

Figure 3E:
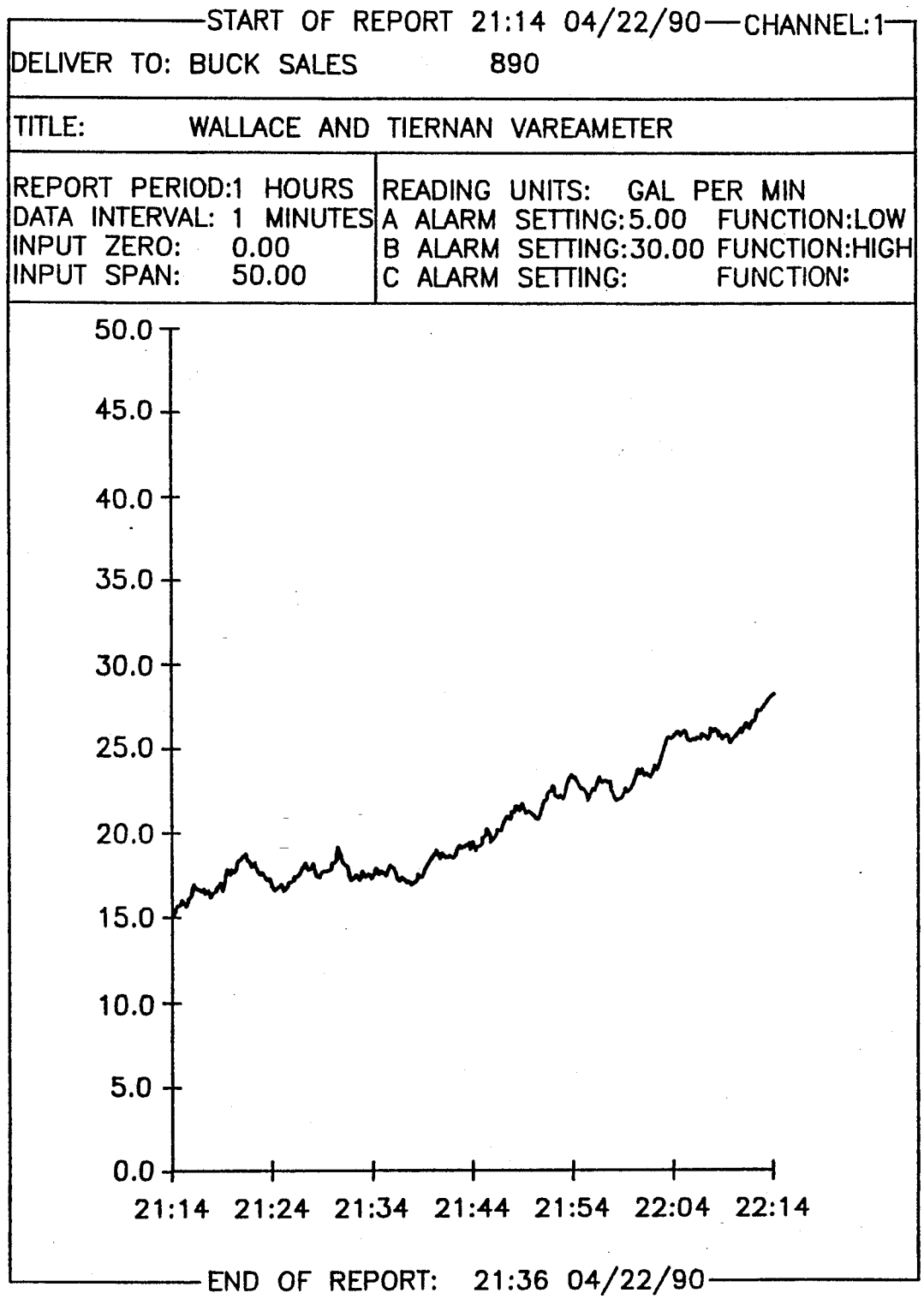

FIGS. 3a–e depict typical reports of TOTAL/ACCUMULATIVE, INSTANT AVERAGE and X-Y graphics. In FIGS. 3a and 3b, a TOTAL/ACCUMULATIVE report for Effluent Flow with defined alarm settings, is depicted. Raw totals as well as cumulated totals are reported over specified time periods and alarm conditions are noted. FIGS. 3c and 3d depicts an Instant Average report for Temperature monitoring with defined alarm settings. FIG. 3e is a graph along X-Y coordinates plotting effluent flow values over a period of time, in terms of gallons per minute. FIG. 3f is a report of an overall system power failure.

Specific examples of device components include an Intel 8051 input/output microprocessor, a Motorola MC 68020 or Intel 80386 facsimile microprocessor, input Teac floppy drives, standard memory chips, telephone interface connectors, etc.

It is understood that the above examples with drawings exemplify the present invention and that changes may be made without departing from the scope of the present invention as defined in the following claims.

What is claimed is:

1. A device for direct monitoring of one or more operating conditions of a system and, upon a reporting condition, for remote reporting thereof, the device comprising means for interfacing the device with external sensing means, which sensing means collects and transmits data regarding operating conditions of the system, said data being transmitted from the sensing means as electrical signals, to said interfacing means, said device further comprising memory storage means and data processing means, with said memory storage means receiving, storing, and cumulating data from the interfacing means and further having programmed processing instructions for the data processing means with which the data processing means analyzes data for a reporting condition, with said data processing means, upon sensing a reporting condition, retrieving data from the memory storage means, and arranging said data in a pre-programmed reporting format, said memory storage means having a pre-programmed data reporting format and Huffman encoding instructions contained therein, with which said data processing means thereafter converts the data and the reporting format itself into facsimile machine readable form, said device further comprising a modem and an interface connection with an external telephone line for transmission, by the data processing means, of the formatted report to one or more remote facsimile machines with said data processing means initiating communication with said one or more remote facsimile machines with telephone numbers thereof contained in said memory storage means.

2. The device of claim 1 wherein said data being transmitted from the sensing means is in analog form and wherein the interfacing means, between the sensing means and the memory storage means, conditions the data by converting it from said analog form to digital form suitable for analysis by said data processing means.

3. The device of claim 2 wherein the electrical signals comprise current fluctuations and said interfacing means converts current to voltage signals.

4. The device of claim 2 wherein said sensing means collects data regarding two or more operating conditions of said system and transmits said data with a different electrical signal for each operating condition and wherein the interfacing means provides optical isolation between said different electrical signals.

5. The device of claim 1 wherein the reporting condition comprises an alarm parameter.

6. The device of claim 5 wherein the operating conditions of the system are continuously monitored by the device.

7. The device of claim 1 wherein the reporting condition comprises a request for a report.

8. The device of claim 1 wherein the reporting condition comprises a timed interval.

9. The device of claim 8 wherein the data processing means is operatively associated with a real time clock.

10. The device of claim 1 wherein said pre-programmed format comprises an x-y graphical representation.

11. The device of claim 1 wherein said pre-programmed format comprises a tabular arrangement of cumulated data.

12. The device of claim 1 wherein said pre-programmed format comprises an instantaneous average of cumulated data.

13. The device of claim 1 wherein the pre-programmed format comprises a message indicating a system failure and its cause.

14. The device of claim 1 wherein said device further includes external means whereby said programmed processing instructions can be changed as desired.

15. The device of claim 14 wherein said external programming means comprises a data entry key pad with a verification display.

16. The device of claim 14 wherein said external programming means comprises a floppy disk drive.

17. The device of claim 14 wherein said external programming means comprises an RS-232 connection for external programming input.

18. The device of claim 1 wherein said device further includes external means whereby said pre-programmed reporting format can be changed as desired.

19. The device of claim 18 wherein said external means comprises a data entry key pad with a verification display.

20. The device of claim 18 wherein said external means comprises a floppy disk drive.

21. The device of claim 18 wherein said external means comprises an RS-232 connection for external programming input.

22. The device of claim 1 wherein said memory storage means further contain instructions to retransmit the report until an acknowledgement signal of receipt is received by the device from said one or more remote facsimile machines.

23. The device of claim 1 wherein said device further includes a disk drive for archival retention of stored data after a report has been generated, with the data in said memory storage means being downloaded into said disk drive prior to or simultaneously with said report generation.

24. The device of claim 1 wherein said data processing means comprises a first microprocessor which analyzes input data for the reporting condition and a second microprocessor, bi-directionally linked to the first microprocessor, with said second microprocessor, upon receiving reporting data from said first microprocessor, arranging said data in a pre-programmed reporting format, and thereafter converting the data and the reporting format itself into facsimile machine readable form for transmission to the one or more remote facsimile machines.

* * * * *